…

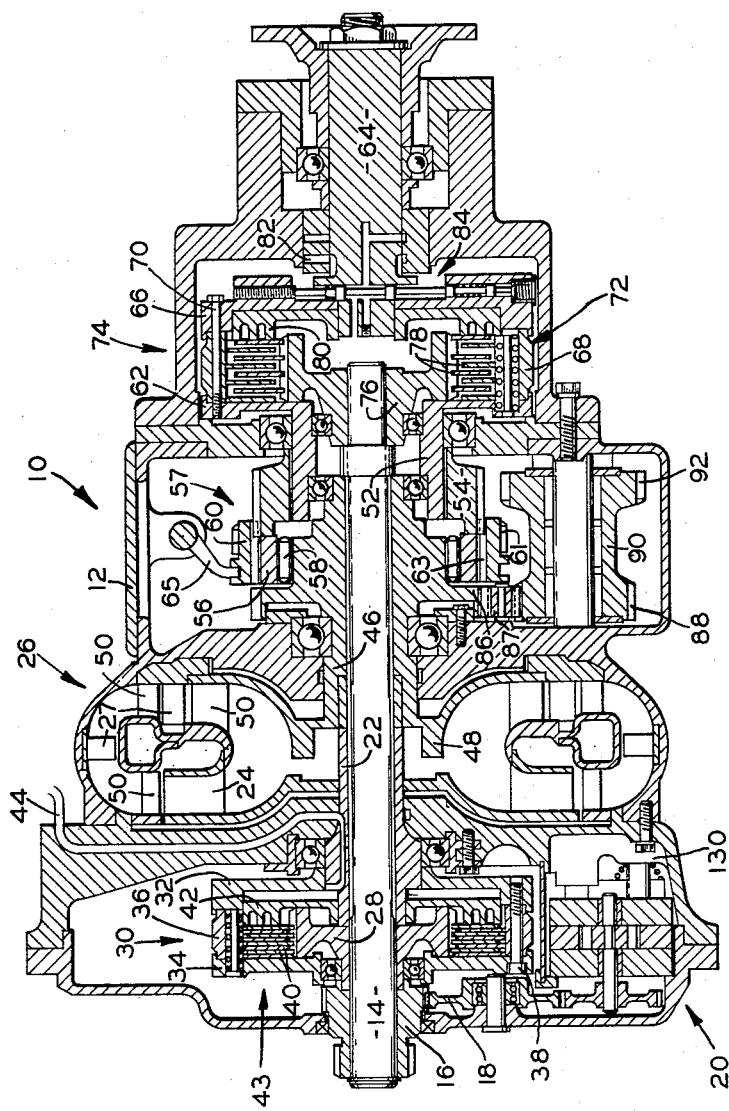

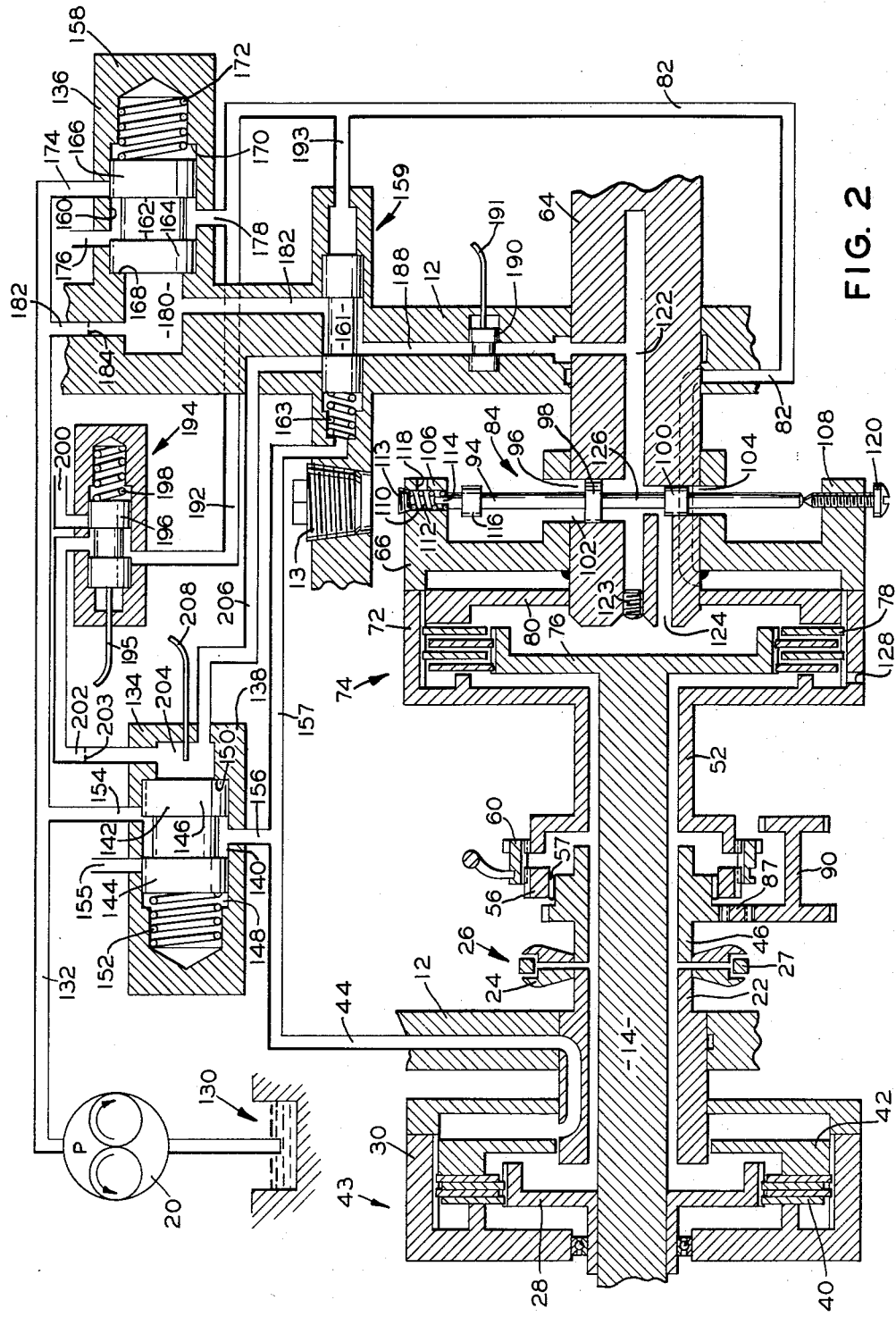

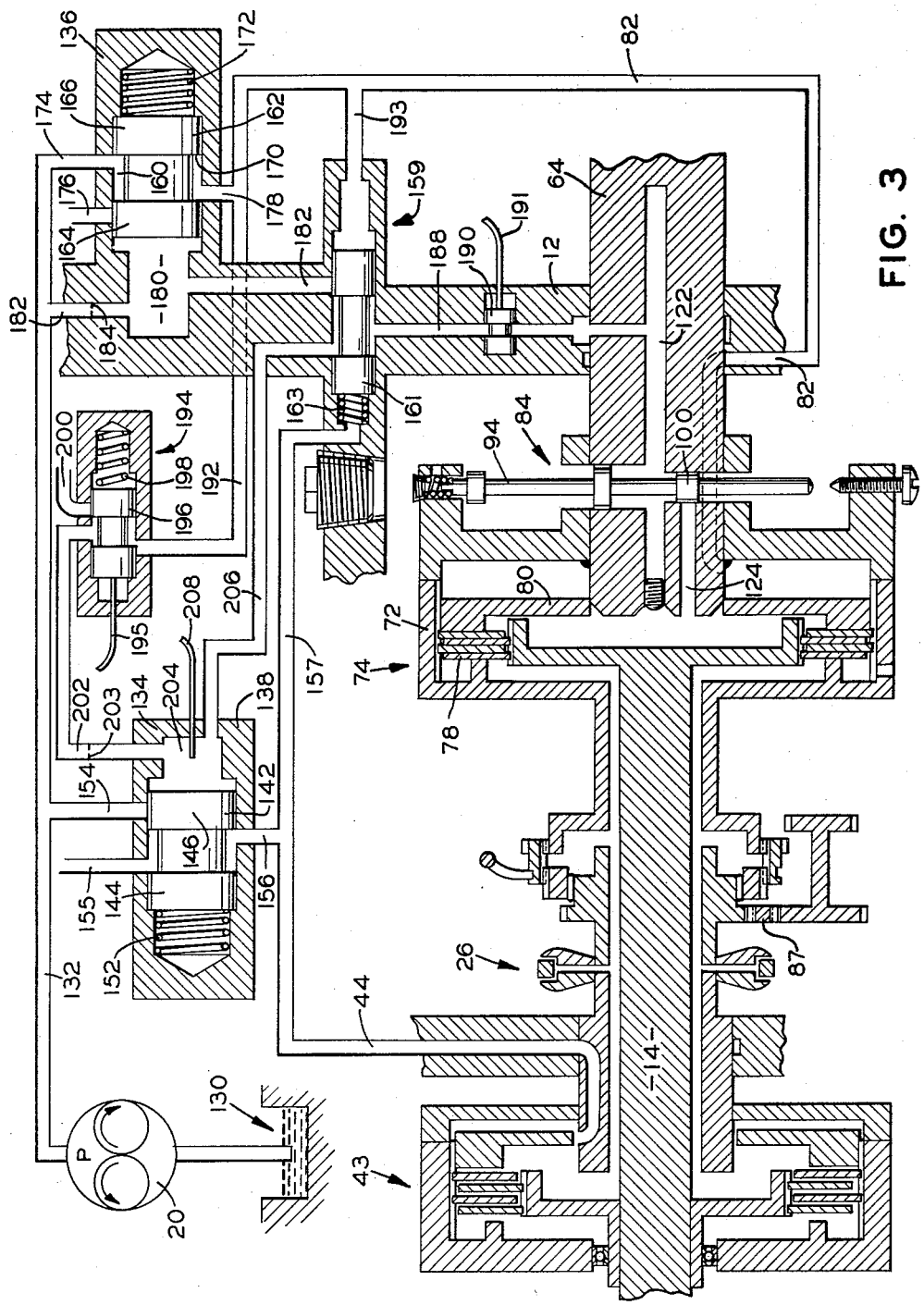

United States Patent Office 3,163,270
Patented Dec. 29, 1964

---

3,163,270
MULTIPLE FLUID CLUTCHES, TORQUE CONVERTER WITH HYDRAULIC CONTROL SYSTEM
Edward W. Zingsheim, Toledo, Ohio, assignor to Dana Corporation, Toledo, Ohio, a corporation of Virginia
Filed Aug. 10, 1961, Ser. No. 130,577
9 Claims. (Cl. 192—3.2)

The present invention relates in general to control systems and governors therefor and particularly to a control system having a governor for a transmission of the type having a plurality of clutches adapted to be operated simultaneously or selectively depending upon the conditions and desires of the operator.

The transmission to which the present invention has been applied is one which requires two clutches; one clutch for the torque converter stage, and another for the direct drive stage. These clutches require controls for engaging either clutch individually for driving or both clutches simultaneously for hydrodynamic braking. However, this control system is not limited to the particular transmission described but may be found useful in other applications.

In many automatic transmissions, changing between the various speed ratios or stages is accomplished by the use of highly complex electrical systems. Other controls utilize fluid pressure which is varied in accordance with the speed of rotation of an element of the transmission by metering the fluid through a valve which is positioned by centrifugal force. Still other control systems utilize complex mechanical means to accomplish the automatic shifting of the transmission. All of these systems are relatively complex, expensive, and difficult to control and maintain.

Therefore, it is an object of this invention to provide a completely hydraulic control system for a change stage transmission or the like which system automatically controls the engaging of the clutches of the transmission by responding to a predetermined change in the transmission speed level.

It is another object of this invention to provide an improved speed responsive governor that will accurately and automatically react to a change in speed and thereby activate a control system.

It is yet another object of this invention to provide a speed responsive governor which has an inherent hysteresis so that reshifting of the transmission will take place at a lower speed than the original shift. Therefore, the momentary power loss during the shifting cycle and resultant loss in speed does not cause the governor to hunt.

It is a further object of this invention to coordinate the improved governor with an improved and simplified control system which is entirely hydraulic, simple, and inexpensive to manufacture and service.

It is a still further object of this invention to provide a control system for a transmission having a torque converter stage and a direct drive stage which system provides for the momentary simultaneous engagement of the clutches for both stages during the shifting thereof so that the source of power for the transmission does not race during the shifting cycle.

Yet a further object of this invention is to provide in a completely automatic hydraulic control system for a change speed transmission or the like, a means for manually actuating the control system to provide for neutral, hydrodynamic braking or a direct drive shift below the normal shifting speed.

Further and more specific objects and advantages of this invention will be readily apparent from the following description and a consideration of the accompanying illustrations wherein:

FIG. 1 is an elevational view in section of a transmission embodying this invention;
FIG. 2 is a diagrammatic view of a portion of the transmission and the complete hydraulic control system therefor in one of its operative positions;
FIG. 3 is a diagrammatic view similar to FIG. 2 with the control system in another of its operative positions.

The present invention provides a simple improved snap acting centrifugal governor which, in response to centrifugal force acting upon it at a predetermined speed, activates a simple control system to accomplish the shifting of the transmission. The control system further has means provided therein so that shifting takes place in the proper sequence and with the desired delay between shifting.

Referring now to the drawings and more particularly to FIG. 1, the transmission shown generally at 10 is of the type having a torque converter stage and a direct drive stage as an alternate source of power. As viewed in the drawing, the left portion of the transmission is the forward end, and the right portion is the rearward end. A casing 12, consisting of a plurality of sections for ease of manufacture and assembly, rotatably mounts a centrally located input or through shaft 14. Immediately within the forward end of the case 12, an accessory drive gear 16 is mounted on the shaft 14 for rotation therewith, and by means of an intermediate gear 18 meshed therewith, is constantly drivingly connected to a pump shown generally at 20. Thus, whenever the source of power (not shown) drives the input shaft 14, the pump 20 is energized and supplies a source of fluid for the control and working fluid systems.

An impeller sleeve 22 is rotatably mounted within the case 12 and upon the shaft 14 and fixedly connected to an impeller section 24 of the hydraulic torque converter portion of the transmission shown generally at 26. The converter section 26 has a plurality of stator sections 27. The impeller sleeve 22 extends forwardly from the converter section 26 and terminates adjacent to a front clutch gear 28, which gear is fixedly mounted on the shaft 14 in any suitable manner.

The sleeve 22 has a cylinder, shown generally at 30, fixedly attached thereto as by welding, which cylinder extends forwardly therefrom and surrounds the gear 28. More particularly, the cylinder 30 has a portion thereof rotatably mounted on the shaft 14 and comprises a pair of annular flanges 32 and 34 spaced apart by an annular member 36 interposed therebetween and interconnected by a plurality of bolts 38. The cylinder 30, and the gear 28 engage alternate members of a plurality of interleaved clutch disks 40 in a well known manner. A piston 42 is slidably disposed on the sleeve 22 within the cylinder 30 between the flange 32 and the gear 28 and is adapted for axial movement relative thereto so that it may alternately compress or release the interleaved disks 40. These cooperating parts form the front or converter clutch 43.

When working fluid is admitted to the cylinder 30 by line 44, which extends through the case 12 and the impeller sleeve 22 into the space between the piston 42 and the cylinder flange 32, the piston 42 is moved axially forward and compresses the interleaved disks 40 thereby engaging the converter clutch 43 which clutch drivingly connects the impeller section 24 with the through shaft 14. When the fluid is exhausted from the cylinder 30, the clutch 43 is disengaged.

Rearwardly of the converter portion 26 is a converter output shaft 46 which is rotatably mounted in the case 12 and on the through shaft 14. More particularly, the shaft 46 has a forwardly extending portion 48 which extends into the converter portion 26 and fixedly receives a turbine blading section 50. When the impeller section 24 is drivingly connected to the input shaft 14 by the front clutch 43, it is adapted to impart a rotational force to the converter output shaft 46 by means of a hydrokinetic reaction in the converter 26. When the front clutch 43 is disengaged, the impeller section 24 is not rotated and the shaft 46 is not driven by the converter 26 and the input shaft 14 may rotate freely therein.

An intermediate shaft 52 is shown positioned rearwardly of the converter output shaft 46 and is rotatably mounted on the shafts 46 and 14 and within the case 12. The shaft 52 has a radially extending gear 54 fixedly mounted on the forward portion thereof adjacent to an outer race 56 of an overrunning or one way clutch 57 having rollers 58 adapted to connect the converter output shaft 46 and the race 56 in the usual manner. A clutch gear 60, having both external and internal teeth, normally engages both the external teeth on the gear 54 and the external teeth on outer race 56. By means of the overrunning clutch 57 connecting the shaft 52 and the shaft 46, the intermediate output shaft 52 may overrun the converter output shaft 46; however, when shaft 52 is rotating slower than shaft 46 it is drivingly connected thereto through one way clutch 57.

The rearward end of the intermediate shaft 52 has a radially extending flange 62 integral therewith. The transmission output shaft 64, which is rotatably mounted in the case 12, has a radially extending flange 66 integral therewith similar in size to the flange 62. These flanges abuttingly engage an annular spacing member 68 interposed therebetween and are fixedly interconnected by means of a plurality of bolts 70. These parts form the cylinder 72 of the rear or direct drive clutch 74. It is also apparent that the cylinder 72 drivingly connects the intermediate shaft 52 to the transmission output shaft 64, and when the shaft 52 is drivingly connected to the converter output shaft 46, the output shaft 64 is driven by the converter section 26 of the transmission 10.

The rearward end of the input shaft 14 terminates adjacent the forward end of the output shaft 64 and has a rear clutch gear 76 fixedly attached thereto. The gear 76 extends radially into the space between the flanges 62 and 66. The cylinder 72 and the gear 76 mount alternate members of a plurality of interleaved clutch disks 78 in a well known manner. A rear clutch piston 80 is slidably disposed on the output shaft 64 and interposed between the rear clutch gear 76 and the flange 66, and is adapted for axial movement relative thereto so that it may alternately compress or release the interleaved disk 78. These cooperating parts form the rear or direct drive clutch 74.

When the working fluid is admitted to the space between the piston 80 and the flange 66 by a fluid line 82, which line extends thereto through the case 12 and the output shaft 64, the piston 80 is moved axially forward and compresses the disks 78 thereby drivingly connecting the gear 76 and the cylinder 72. In this manner the input shaft 14 and the output shaft 64 are directly drivingly connected. It should be noted that the intermediate shaft 52 is also drivingly connected to the output shaft 64; however, by means of the overrunning clutch 57, the output shaft 64 may overrun the converter output shaft 46 and thereby not be affected by the converter section 26 when the unit is in direct drive.

Means are provided to enable the attainment of reverse rotation of the output shaft relative to the input shaft while the transmission 10 is being operated by the converter section 26. More specifically the converter output shaft 46 is provided with a radially extending reverse gear 86 which is constantly in mesh with an intermediate gear 87. The intermediate gear 87 is rotatably mounted in the case 12 and in mesh with a toothed portion 88 of a speed gear 90. Another toothed portion 92 of the gear 90 is adapted to be drivingly connected to the gear portion 54 of the intermediate shaft 52 by the clutch gear 60. The clutch gear 60 has external teeth 61 thereon which are adapted to mesh with the toothed portion 92 of the speed gear 90 and internal teeth 63 which are always engaged with the shaft 52. The clutch gear 60 is adapted to be moved to its alternate position by a shift fork 65. When the transmission is conditioned for reverse by operation of the shift fork 65, the flow of power passes from the converter section 26, to the converter output shaft 46, to the intermediate gear 87, then to the spool gear 90, to the intermediate shaft 52, and finally to the output shaft 64.

Referring now particularly to FIG. 2, wherein the control system and a speed responsive governor 84 therefor are disclosed diagrammatically in detail, the transmission 10 is shown with the converter clutch 43 engaged and the direct drive clutch 74 disengaged.

The speed responsive device or governor, shown generally at 84, includes a centrifugal force responsive valve 94 which is positioned in an opening 96 extending diametrically through the output shaft 64 and transverse to the axis thereof. The valve 94, shown in its inward position, has upper and lower enlargements or land areas 98 and 100. The upper land area 98 and the upper portion 102 of the opening 96 are larger than the lower land area 100 and the lower portion 104 of the opening 96.

The flange portion 66 of the cylinder 72 has a pair of aligned, rearwardly extending bosses 106 and 108. The boss 106 has a radial opening 110 therein which receives the upper end of the valve 94 and a coil spring 112 positioned around a reduced portion 114 of the valve 94. The reduced portion 114 is piloted within the spring 112 for guiding the valve 94. A screw plug 113 is threadedly received in the radially outward end of opening 110 and positions the spring 112 in a preloaded condition to bias the valve 94 inwardly.

A shoulder 116 is positioned on the valve 94 so that it will abut the boss 106 and limit the outward movement of the valve 94, and an opening 118 in the boss 106 confluent with the opening 110 is provided to relieve any pressure built up behind the valve 94 which might interfere with the free movement thereof. A positioning screw 120 is provided in the boss 108 and abuts the lower end of the valve 94 to adjustably determine the inward position thereof. The case 12 is provided with a threaded plug 13 which is conveniently positioned and easily removed so that access may be had to the governor components.

A control fluid line 122 is positioned centrally in the output shaft 64 and intersects the central portion of the opening 96 between the lands 98 and 100 of the valve 94. The opening of line 122 at the forward end of the shaft 64 is plugged in any suitable manner as shown at 123. A second line 124 extends inwardly from the forward end of the shaft 64 and intersects the lower portion 104 of the opening 96 and, when the valve 94 is in its lower position as shown, line 124 lies between the lands 98 and 100 of the valve 94 and is confluent with line 122.

In operation, line 122 is constantly supplied with control fluid which passes a reduced intermediate portion 126 of valve 94 between the lands 98 and 100 thereof and is discharged from line 124 into the clutch 74 and finally out of the clutch 74 through a plurality of openings 128 therein to a sump 130 conveniently disposed in case 12. In response to centrifugal force upon the valve 94, when rotated by the output shaft 64, the valve 94 moves outwardly to the position shown in FIG. 3 whereby land 100 blocks offset line 124. If the lines 122 and 124 were aligned, when land 100 blocked line 124 there would be pressure upon one side (the upstream side) of the valve 94 only. This would cause the valve 94 to be bindingly urged against the side of the opening 96 due to the one sided force of the fluid upon it. By arranging the lines as shown, and providing a reduced valve portion 126, the pressure on the sides of valve 94 is equal and no binding occurs.

The center of gyration and weight of the valve 94 and the spring rate and biasing force of the spring 112 are selected in accordance with predetermined calculations. By selecting a spring with a low rate, its increase in biasing force due to being compressed is very slight. The center of gyration and weight of the valve 94 is selected so that a predetermined rotational speed on acceleration, the centrifugal force acting upon the valve 94 will increase its load upon the spring 112 compressing it when the spring preload is exceeded. A slight outward movement of the valve 94 at the start of spring compression results in the valve's center of gyration moving to a greater radius from the axis of rotation than normal thereby further increasing the centrifugal force on the valve 94. This increase is of a relatively large magnitude due to the design of the valve 94. More particularly, it is apparent that the valve 94 transverses the axis of rotation of shaft 64; therefore, the centrifugal force on the lower portion offsets the centrifugal force on the upper portion of the valve. When the valve 94 moves outwardly, not only does the effective radius of gyration of the upper portion move outwardly thereby increasing the centrifugal force thereon, but the effective radius of gyration on the lower portion moves inwardly thereby decreasing the centrifugal force thereon. Since the biasing force of the low rate spring 112 increases only slightly because of compression, and the effective centrifugal force on the valve 94 increases at a much higher rate due to the above, the valve 94 at the predetermined speed will move rapidly and travel toward its extreme outer position when the preloaded weight of the spring has been exceeded. When the land 100 begins to close line 124 the fluid pressure on the larger land 98 is greater than on the smaller land 100 and the pressure differential aids the centrifugal force in urging the valve 94 outwardly.

When rotating at speeds above the predetermined governed speeds, the valve is held in its outermost position by centrifugal force combined with the control fluid which is now enclosed in line 122. The fluid pressure builds up against lands 98 and 100, and since land 98 is larger in area, the force on it is greater than on land 100 and this force differential aids in maintaining valve 94 outwardly.

Upon decelerating from above the governed speed, the effective radius of gyration of the valve 94 is at a greater distance from the axis of rotation than it was upon acceleration and in addition the fluid pressure differential is urging valve 94 outwardly; therefore, at this time valve 94 exerts a greater load on spring 112 than just prior to the attainment of governed speed on accelerating. Since centrifugal force is dependent upon the radius of gyration as well as rotational velocity and here the effective radius of gyration on deceleration is greater than on acceleration, at the same rotational velocity when decelerating, the valve 94 will impose a greater load upon the spring 112 than upon acceleration. Thus, on deceleration, the rotational velocity which induces a centrifugal force upon the valve 94 will have to fall to a lower value to allow return of the valve 94 to its original position in response to the biasing force of spring 112 than the velocity which caused the outward movement. This provides the desired hysteresis of valve 94 so that down-shifting occurs at a lower rotational velocity than upshifting.

The pump 20, since it is driven by the input shaft 14 to the transmission 10, supplies a constant flow of fluid to the manifold line 132 whenever rotational forces are transmitted to the transmission. The fluid from the manifold 132 supplies both the control and working fluid circuits of the control system.

Positioned conveniently in the case 12 are the front or converter clutch control or regulating valve 134 and the rear or direct drive control or regulating valve 136. Both the valves 134 and 136 control the working fluid in response to signals from the control fluid. The front control valve 134 consists of a valve body 138 having a central bore 140 therein which slidingly receives a valve piston 142. The piston 142 is provided with a pair of spaced land areas 144 and 146. The bore 140 has a left and a right shoulder portion 148 and 150 respectively for limiting the axial movement of the piston 142. A spring 152, of predetermined biasing effect, normally urges the piston 142 to the right. In this position, an inlet line 154, which receives working fluid directly from the manifold 132, is open and confluent with an outlet line 156. Thus, working fluid may pass through lines 154 and 156 to a line 44 which in turn passes the fluid to the front clutch cylinder 30 where it reacts upon the piston 42 to compress the interleaved disks 40 and engage the front clutch 43. A vent line 155 provided in the valve 134, leads to the sump 130, and is closed at this time. A branch line 157 connects the outlet line 156 with the left end of a lag or sequence controlling valve 159 which is controlled by the working fluid from valves 134 and 136. The working fluid from outlet line 156 also passes through this branch line 157 to the valve 159 and urges a piston 161 provided therein to the right, aided by a spring 163 compressed within the valve.

The rear or direct drive clutch control valve 136 consists of a valve body 158 having a bore 160 which receives a valve piston 162. The piston 162 is provided with a pair of spaced land areas 164 and 166. Bore 160 has a left and a right shoulder portion 168 and 170 for limiting the axial movement of piston 162. A spring 172 compressed within the valve 136 normally urges the piston 162 to the left thereby closing a valve inlet line 174 which is connected directly to manifold line 132 and opening a valve vent line 176 which leads to the sump 130. An outlet line 178 from the bore 160 joins with a line 82 which passes through the output shaft 64 and into the rear clutch cylinder 72. At this stage of the operation lines 178 and 82 are opened to the vent line 176 and the clutch 74 is disengaged.

The valve body 158 of valve 136 is provided with a chamber 180 to the left of piston 162. A control fluid line 182 joins the manifold line 132 with the chamber 180 and is provided with a suitable orifice 184 for reducing the manifold pressure to a lower level for control purposes and to reduce the flow of fluid therethrough so that venting of the chamber 180 does not substantially lower the fluid pressure in the manifold line 132. The line 182 passes through the chamber 180 and extends to the lag or sequence determining valve 159 which at this time is open to line 182 and allows control fluid to flow therethrough to an outlet line 188. Outlet line 188 which has a manually operated shut off valve 190 therein, is confluent with the control fluid line 122 located centrally in the output shaft 64. The line 122 at this stage of the operation is open to vent through line 124.

To cause a shift to direct drive, at the predetermined governed speed the governor valve 94 moves outwardly as shown in FIG. 3 so that the land 100 thereon closes the line 124. This causes the pressure of the fluid in control lines 122, 188 and 182 downstream of orifice 184 and in chamber 180 to build up to maximum control line pressure and urge piston 162 to the right against the bias of compression spring 172 into engagement with shoulder 170 of valve 136. The land 164 on piston 162 then closes vent line 176 and land 166 moves away from and opens the working fluid inlet line 174. Working fluid from the manifold line 132 now passes through valve 136 into outlet line 178 and into working fluid line 82 and therethrough to the clutch cylinder 72 urging the piston 80 to the left, thereby compressing the interleaved disks 73 and engaging the clutch 74. A line 193 extends from the working fluid line 82 into the right hand side of lag valve 159 and the working fluid therein attempts to move the piston 161 to the left against the bias of spring 163. However, at this time working fluid pressure is present in line 157, and this pressure combined with the biasing of spring 163 prevents piston 161 from being moved.

A second line 192, for controlling the front clutch valve 134, extends from the outlet line 178 of the valve 136 to a manually operated hydrodynamic braking valve 194, which at this time has its piston 196 urged to the left by a spring 198 thereby closing a vent line 200, leading to the sump 130 and opening a control fluid line 202 provided therefor. Line 202 leads to a chamber 204 in the valve body 138 of valve 134 and is provided with an orifice 203 to reduce the manifold pressure to control pressure and to restrict the flow of fluid therethrough so that venting of the chamber 204 does not substantially lower the pressure in the line 202 and the lines confluent therewith. The chamber 204 is on the right side of piston 142 and as the fluid pressure in the direct drive clutch cylinder 72 builds up to working line pressure, the fluid pressure in the lines 82, 192, and 202, and in chamber 204 builds up and urges the piston 142 to the left against the bias of spring 152 so that the land 144 opens vent line 155, and the land 146 closes inlet line 154.

The biasing effect of the spring 152 is selected whereby the pressure required to move the piston 142 is sufficiently high so that the clutch 74 is completely engaged before the chamber 204 has sufficient pressure therein to urge the piston 142 to the left. This is essential so that the front clutch 43 will remain engaged, at least momentarily, after the rear clutch 74 has become engaged so that the engine (not shown) driving the transmission 10 will not race during a hot shift as it would with both clutches disengaged simultaneously. Since the valve 134 is now open to the vent line 155, the front clutch 43 is vented of working fluid through lines 44, 156, and 155 and becomes disengaged. The function of vent line 206 which extends into valve 159 from chamber 204 will be more fully discussed hereinafter. Since line 156 is now open to vent, so is line 157 which is confluent therewith. This vents the left side of valve 159 allowing the working fluid pressure in line 193 to move the piston 161 to the left against the bias of spring 163 which is no longer aided by the pressure in line 157.

From the foregoing, it is apparent that during the shift from converter drive to direct drive, the direct drive clutch becomes engaged before the converter clutch is disengaged. On the down shift from direct to converter drive, it is also desirable to have both clutches momentarily simultaneously engaged so that engine racing does not occur when a hot shift is made. For this purpose, the lag or sequence selector valve 159 is provided.

As previously noted, when the direct drive clutch 74 is energized, the working fluid in line 193, which is confluent with line 82, urges the piston 161 of the lag valve 159 to the left against the bias of spring 163 thereby closing line 182 from control line 188 and opening vent control line 206 to line 188. However, as long as the output shaft 64 is rotating above the governed speed, the valve 94 will prevent lines 122, 188, and 206 from venting.

As soon as the downshift speed is reached, valve 94 moves inwardly venting lines 122, 188, and 206 and chamber 204 thereby allowing piston 142 of valve 134 to be urged to the right by spring 152 thereby closing vent line 155 and opening inlet line 154 of valve 134. Working fluid then passes through lines 154, 156, and 44 and engages the front clutch 43. As soon as pressure is built up in the front clutch 43, it is also built up in line 157, which is confluent with line 156, and the piston 161 is urged to the right by the combined pressure of the fluid in line 206 and spring 163 against the pressure of the working fluid still present in line 193 on the right side of valve 159 since the direct drive clutch 74 is still engaged. Control fluid line 182 then becomes confluent with vented lines 188 and 122 thereby venting chamber 180 of valve 136 allowing the piston 162 therein to be biased to the left by spring 172 opening the working fluid vent line 176 and closing the working fluid input line 174. The direct drive clutch 74 is then vented through lines 82, 178, and 176 and becomes disengaged. From the foregoing it is apparent that the regulating or lag valve 159 is controlled by the front and rear clutch regulating valves 134 and 136 and that valve 159 determines the sequence in which valve 94 controls valves 134 and 136.

Means is provided whereby the operator may shift to direct drive at any point in the operation even though the transmission 10 is below the governed speed. More specifically, the line 188 has a manually controlled shut off valve 190 therein, which valve may be closed by moving the rod 191 and the valve 190 to the right. This accomplishes the same result in energizing the shifting sequence that would result if the valve 94 were moved outwardly in response to centrifugal force and closed line 122. When the valve 190 is closed, the direct drive clutch 74 becomes engaged and the converter clutch 43 becomes disengaged in a manner previously described.

Means is also provided to engage both the direct drive and the converter clutches simultaneously for hydrodynamic braking. The hydrodynamic braking valve 194 is positioned for normal operation with the control lines 192 and 202 supplying the chamber 204 of the converter clutch control valve 134 in a confluent relationship. By manually moving the rod 195 and piston 196 of the valve 194 to the right, the control line 192 is closed, and vent line 200 becomes confluent with line 202 thereby venting chamber 204 of valve 134. Piston 142 is then biased to the right by spring 152 closing working fluid vent line 155 and opening working fluid inlet line 154 to lines 156 and 44 thereby energizing the converter clutch 43. This will result in both clutches 43 and 74 being engaged and remaining engaged until the output shaft 64 drops below the governed speed. At this time the direct drive clutch 74 could disengage as previously described; however, for complete hydrodynamic braking, the manual operation of valve 194 is coupled with the closing of valve 190, which energizes the direct drive clutch 74, thereby insuring the continued engagement of both clutches 43 and 74. With both clutches engaged, the output shaft 64 will be retarded by engine braking and in addition, the output shaft is directly clutched to the input shaft 14 which in turn is clutched to the impeller sleeve 22 and impeller section 24. The rotation of the impeller section 24 is reacted against by the stators 27 of the converter 26 thereby aiding in retardation of the output shaft 64.

Means is also provided for the simultaneous disengagement of both clutches 43 and 74 or a neutral condition, as required when the unit is shifted from forward to reverse. The valve 134, which is normally opened to the passage of working fluid to engage the converted clutch 43, is provided with a suitable manual control means shown generally by rod 208. By pushing the rod 208 inwardly, the piston 142 is moved to the left thereby venting the converter clutch 43 as previously described. Since the direct drive clutch is normally disengaged when the vehicle is idling, no provision is necessary for its disengagement to achieve neutral.

From the foregoing it is apparent that a speed responsive governor and a control system for a transmission have been described which automatically controls the engaging of the clutches of the transmission by responding to a predetermined change in the transmission speed level; that will accurately and automatically react to a change in speed and thereby activate the control system, that has an inherent hysteresis so that reshifting will take place at a lower speed than the original shift; which system prevents the engine driving the transmission from racing during the shift cycle; which system is entirely hydraulic, simple in operation, and inexpensive to manufacture and service and includes means for manually actuating the control system.

The preferred embodiment of this invention has been shown and described, but changes and modifications can be made, and it is understood that this description is illustrative only and not for the purpose of rendering this invention limited to the details illustrated or described except insofar as they have been limited by the terms of the following claims.

What is claimed is:

1. In a transmission a control system comprising a first clutch means and a first control means therefor, a second clutch means and a second control means therefor, a speed responsive means for controlling operation of said first and second control means, said second control means controlling operation of said second clutch means in response to operation of said first control means, and means controlled by both said first and second control means controlling operation of said first control means to operate said first clutch means in response to operation of said second control means whereby the operation of each of said first and second control means influences the operation of the other.

2. In a transmission having alternate power trains for driving an output shaft a control system comprising a first clutch means in the first alternate power train operative when engaged to transmit power through the first power train, first control means for controlling operation of said first clutch means, a second clutch means in the second alternate power train operative when engaged to effect the transmission of power through the second power train, second control means for controlling the operation of said second clutch means, a speed responsive means operated by the output shaft for controlling operation of said first and second control means, said second control means controlling operation of said second clutch means to effect disengagement thereof in response to the operation of said first control means, and means operative in response to the operation of said second control means to operate said first control means and effect engagement of said first clutch means whereby the operation of each of said first and second control means influences the operation of the other.

3. In a transmission having alternate power trains for driving an output shaft a control system comprising a first fluid operated clutch in the first alternate power train operative when engaged to transmit power through the first power train, a second fluid operated clutch in the second alternate power train operative when engaged to effect the transmission of power through the second power train, a fluid circuit, a first control valve in said fluid circuit and operatively connected to said first clutch means for controlling the operation thereof, a second control valve in said fluid circuit and operatively connected to said second clutch for controlling the operation thereof, speed responsive means operated by the output shaft for controlling the operation of said first and second valves, said second valve effecting disengagement of said second clutch upon engagement of said first clutch, and means including a third fluid operated valve controlled by both said first and second valves and being operative when said first clutch is engaged upon engagement of said second clutch to operate said first valve and effect disengagement of said first clutch whereby said second clutch is engaged before the other is disengaged.

4. A transmission for transmitting power from an input shaft to an output shaft comprising a hydrodynamic torque converter power train, and a mechanical power train for alternatively transmitting power between said shafts, a first fluid operated clutch in said mechanical power train operative when engaged to transmit power through said mechanical power train, a second fluid operated clutch in said converter power train operative when engaged to effect the transmission of power through said converter power train, a fluid circuit, a first valve in said fluid circuit and operatively connected to said first clutch means for controlling the operation thereof, a second valve in said fluid circuit and operatively connected to said second clutch for controlling the operation thereof, control fluid lines in said fluid circuit for controlling the operation of said first and second valves, speed responsive means operated by the output shaft for controlling fluid flow in said control fluid lines, said second valve being controlled by said first valve, and means including a third fluid operated valve controlled by both said first and second valves and being operative when said first clutch is engaged and upon engagement of said second clutch to operate said first valve and effect disengagement of said first clutch whereby said second clutch is engaged before the other is disengaged.

5. In a transmission as defined in claim 4 including a manually operated clutch valve interposed in said fluid circuit and controlling said first valve so that said mechanical power train is manually selectable.

6. In a transmission as defined in claim 5 including a manually operated valve interposed in said fluid circuit and controlling said second valve so that said torque converter power train is manually selectable for operation with said mechanical power train for hydrodynamic braking.

7. In a transmission as defined in claim 4 including a manually operated neutral obtaining means for closing said second valve to cause disengagement of said second clutch means.

8. A control system for a transmission comprising in combination
    (a) a first working fluid operated clutch,
    (b) a second working fluid operated clutch,
    (c) a working fluid supply line for each of said clutches,
    (d) a first control fluid responsive valve disposed in said working fluid supply line for said first clutch and having open and vent positions, said valve normally being positioned to vent said first clutch disengaging the same,
    (e) a second control fluid responsive valve disposed in said working fluid supply line for said second clutch and having open and vent positions, said second valve being normally in an open position whereby working fluid passes to said second clutch engaging the same,
    (f) a control fluid supply line for each of said valves,
        (1) said control fluid supply line for said first valve being constantly supplied with control fluid,
        (2) said control fluid supply line for said second valve being supplied with control fluid from said working fluid supply line for said first clutch only when said first valve opens said first clutch working fluid line,
    (g) a control fluid vent line for each of said valves,
    (h) a speed responsive valve positioned in said control fluid vent lines and being adapted to alternately vent or close said vent lines and being normally in a vent position,
    (i) a third fluid operated valve positioned in said vent lines and adapted to alternately open said vent lines to said speed responsive valve whereby said speed responsive valve may vent the same,
        (1) the position of said third fluid operated valve being controlled by the fluid in said first and second clutch working fluid supply lines so that fluid in said second working fluid supply line will cause said third fluid operated valve to open said control vent line for said first valve,
    (j) whereby in response to a predetermined rotational velocity on acceleration said speed responsive valve will close said control fluid vent line to said first fluid operated valve to cause opening of said first working fluid supply line to said first clutch, said third fluid operated valve, and said second fluid operated valve thereby engaging said first clutch and moving said second fluid operated valve to vent said second working fluid line disengaging said second clutch and moving said third fluid operated valve to open said second fluid operated valve vent line to said speed responsive valve,
    (k) and whereby in response to a predetermined rotation velocity on deceleration said speed responsive valve will open said control fluid vent line to said second fluid operated valve which then passes working fluid to said second clutch and to said third fluid operated valve thereby engaging said second clutch and moving said third fluid operated valve to open said first fluid operated valve vent line venting the same whereby said first fluid operated valve moves to the vent position to vent the first clutch disengaging the same.

9. A control system for a transmission comprising in combination
(a) a first working fluid operated clutch,
(b) a second working fluid operated clutch,
(c) a working fluid supply line for each of said clutches,
(d) a first control fluid responsive control valve disposed in said working fluid supply line for said first clutch and having open and vent positions, said valve normally being positioned to vent said first clutch disengaging the same,
(e) a second control fluid responsive valve disposed in said working fluid supply line for said second clutch and having open and vent positions, said second valve being normally in an open position whereby working fluid passes to said second clutch engaging the same,
(f) a control fluid supply line for each of said valves,
  (1) said control fluid supply line for said first valve being constantly supplied with control fluid,
  (2) said control fluid supply line for said second valve line being supplied with control fluid from said working fluid supply line for said first clutch only when said first valve opens said first clutch working fluid line,
(g) a control fluid vent line for each of said valves,
(h) a common control fluid vent line joining said control fluid vent lines,
(i) a speed responsive means positioned in said common control fluid vent line and being adapted to alternately vent and close said common line including
  (1) a rotating member having a longitudinal axis and an opening extending diametrically therein with a first and second portion, said first portion being of greater diameter than said second portion,
(j) a valve member received in said opening portions transversing said axis and having a first enlargement thereon slidably engaging the first portion of said opening and a second enlargement thereon smaller than said first enlargement slidably engaging the second portion and an intermediate portion being positioned between said first and second enlargements,
(k) resilient means biasing said valve member whereby said first enlargement is urged radially inward,
(l) said common control fluid vent line being disposed in said rotating member in an intersecting relationship with said opening,
(m) an extension of said control fluid vent line in said rotating member being disposed in an intersecting relationship with said second opening portion,
(n) the intersection of said common control fluid vent line and said extension line with said opening portions being between said first and second enlarged portion of said valve member when said member is in its inward position so that extension line is confluent with said common vent line,
(o) the weight and configuration of said valve member and the rate of said resilient means being such that in response to centrifugal force at a first predetermined rotational velocity on acceleration said valve member will move rapidly outwardly against the bias of said resilient means whereby the second enlargement of said valve member will block said extension control fluid vent line thereby prohibiting fluid in said common control fluid vent line from flowing through said extension line,
(p) passage means associated with said valve intermediate portion whereby fluid in said common control fluid vent line may surround said intermediate portion to balance the fluid pressure thereon and prevent binding of said valve with said opening,
(q) said control fluid exerting a greater radial force against said first enlargement than against said second enlargement when said second enlargement blocks said extension control fluid vent line thereby biasing said valve member outwardly against said resilient means,
(r) the centrifugal force acting upon said valve member being greater when said member is displaced outwardly than when said member is in its inward position whereby upon deceleration the increased centrifugal force and the unbalance of pressure acting upon said valve member maintain the same outwardly until a lower rotational velocity is reached than the rotational velocity necessary to cause the outward movement resulting in a hysteresis in the movement of said valve,
(s) a third fluid operated valve positioned in said control fluid vent lines and adapted to alternately open said vent lines to said speed responsive means whereby said speed responsive means may vent the same,
  (1) the position of said third fluid operated valve being controlled by the fluid in said first and second clutch working fluid supply lines and arranged so that fluid in said second working fluid supply line will cause said third fluid operated valve to open said control vent line for said first valve,
(t) whereby in response to a predetermined rotational velocity on acceleration said speed responsive means will close said control fluid vent line to said first fluid operated valve to open said first working fluid supply line to said first clutch, said third fluid operated valve, and said second fluid operated valve thereby engaging said first clutch and moving said second fluid operated valve to vent said second working fluid line disengaging said second clutch and moving said third fluid operated valve to open said second fluid operated valve vent line to said speed responsive means,
(u) and whereby in response to a predetermined rotation velocity on deceleration said speed responsive means will open said control fluid vent line to said second fluid operated valve opening the same which then passes working fluid to said second clutch and to said third fluid operated valve thereby engaging said second clutch and moving said third fluid operated valve to open said first fluid operated valve vent line venting the same whereby said first fluid operated valve moves to the vent position to vent the first clutch disengaging the same.

References Cited in the file of this patent
UNITED STATES PATENTS

| | | |
|---|---|---|
| 2,544,551 | Black | Mar. 6, 1951 |
| 2,607,456 | Jandasek | Aug. 19, 1952 |
| 2,620,814 | Hobbs | Dec. 9, 1952 |
| 2,702,616 | Black et al. | Feb. 22, 1955 |
| 2,858,839 | Jackson | Nov. 4, 1958 |
| 2,889,718 | Schjolin et al. | June 9, 1959 |
| 2,929,478 | Tuck et al. | Mar. 22, 1960 |
| 2,969,131 | Black et al. | Jan. 24, 1961 |